Aug. 4, 1942.  M. E. FIENE  2,292,112
TEMPERATURE CONTROL SYSTEM
Filed Feb. 14, 1941  2 Sheets—Sheet 1
Fig.1.
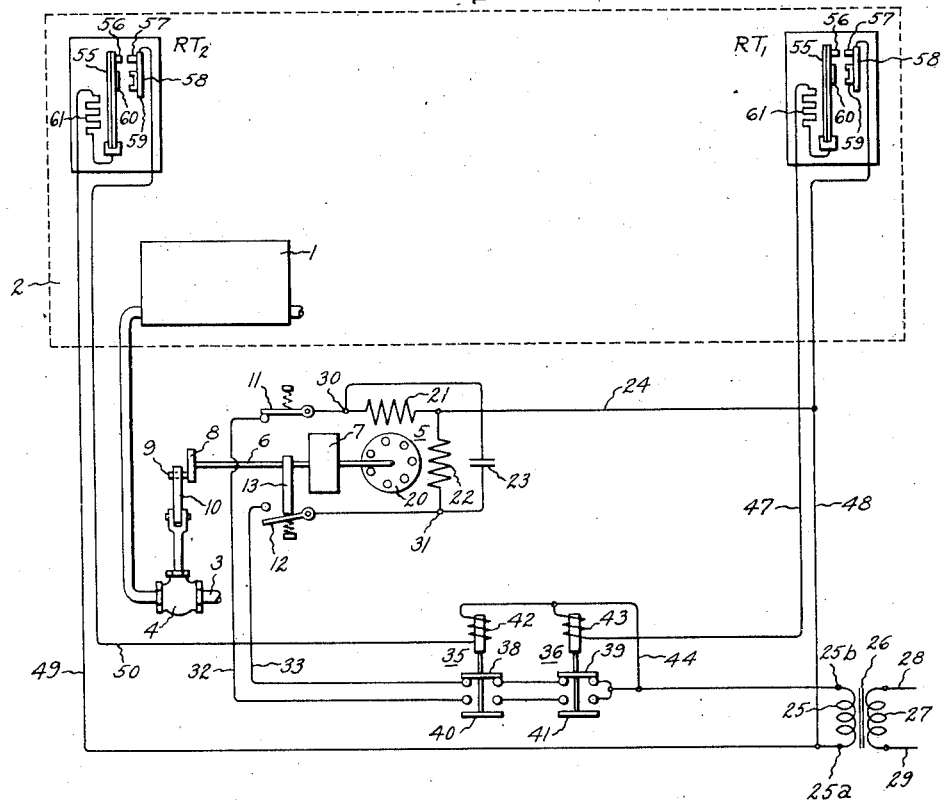
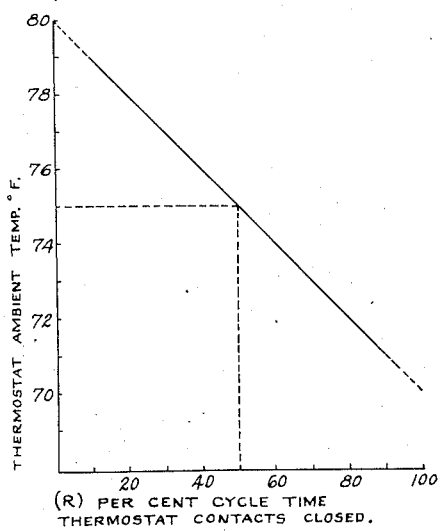
Fig.2.
Inventor:
Marcus E. Fiene,
by Harry E. Dunham
His Attorney.

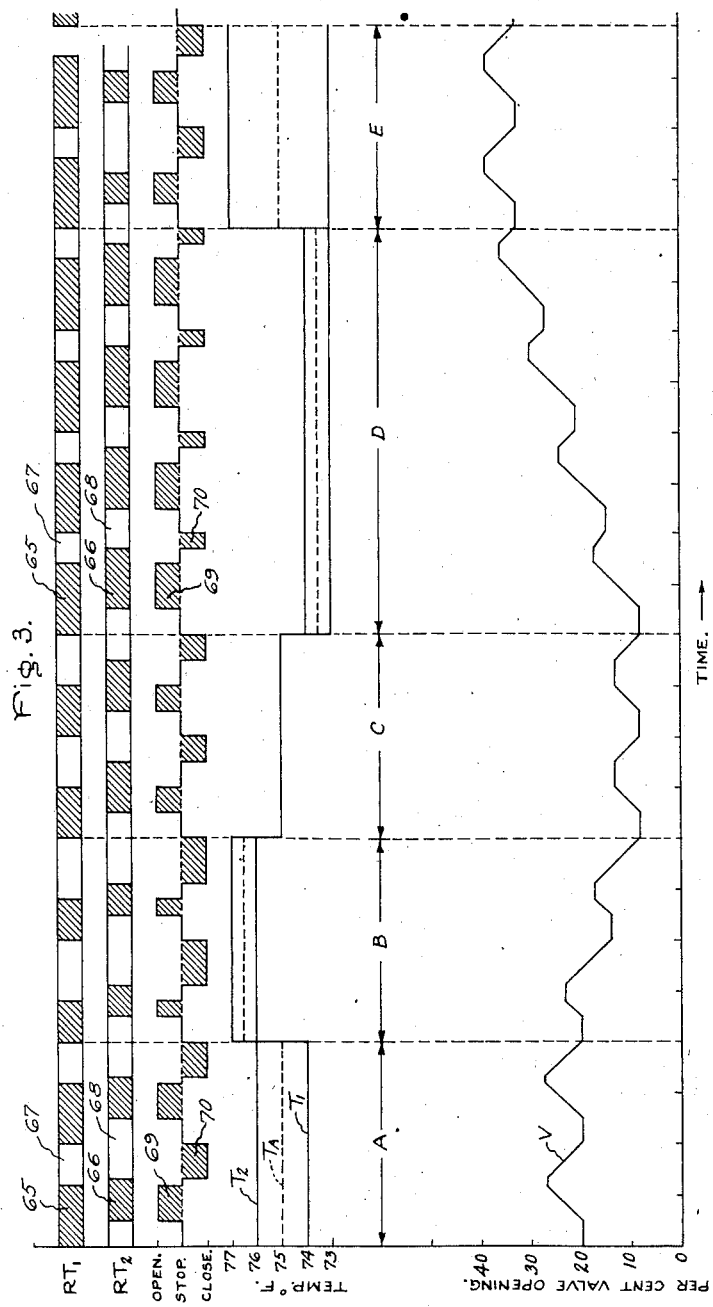

Patented Aug. 4, 1942

2,292,112

UNITED STATES PATENT OFFICE 2,292,112

TEMPERATURE CONTROL SYSTEM

Marcus E. Fiene, Caldwell, N. J., assignor to General Electric Company, a corporation of New York Application February 14, 1941, Serial No. 378,913

7 Claims. (Cl. 236—1)

My invention relates to control systems and more particularly to temperature control systems.

It is common in the art of temperature controlling to provide, a modulating or regulating device for controlling the output of conditioning apparatus operating to supply a heating or cooling medium to one or more heat exchangers located in the space or spaces to be conditioned. The regulating device is generally controlled by a single thermostat responsive to the temperature at some place within the conditioned space. It has been found that the temperature in different zones in the conditioned space may vary considerably with various outside temperature conditions so that, even though the conditioning apparatus functions to maintain a uniform temperature at the location of the thermostat, the temperatures in other zones of the conditioned space fluctuated sufficiently to cause discomfort to the occupant. For example, a variable differential may exist between the temperature of a room in a zone adjacent an outside wall and a temperature in a zone adjacent an inside wall. Also, a variable temperature differential may exist between the breathing line level and the floor line level due to air stratification. Hence it is practically impossible to locate a single thermostat in a conditioned space where it will be responsive to an average temperature condition in the space. This problem is also aggravated by the fact that it is usually necessary to mount the thermostat on a wall where the air temperature may differ considerably from the temperature of the air at other locations within the enclosed space.

Accordingly, it is an object of my invention to provide an improved temperature control system which will maintain constant an average temperature condition of a conditioned space.

More particularly, it is an object of my invention to provide means responsive to the temperatures in different zones of a conditioned space for controlling conditioning apparatus so as to maintain constant an average of the temperature existing in these different zones.

Another object of my invention is to provide an improved regulating device controlled jointly by two condition responsive devices in such a manner that its regulating action is a function of the average of the two regulated conditions.

Further objects and advantages of my invention will become apparent as the following description proceeds and the features of novelty which characterize my invention will be pointed out with particularity in the claims annexed to and forming a part of this specification.

Briefly, according to my invention, conditioning apparatus such as for example, building heating apparatus, is controlled by a regulating device governing, according to its position, the output of the heating apparatus. The regulating device is controlled by a reversible operator whose movement is in turn controlled by a pair of two-position control devices functioning in such a manner that when both of the control devices are aligned in one position the operator moves in one direction and when both of the control devices are aligned in the other position the operator moves in the opposite direction but when the control devices are in different positions the operator remains stationary. Each of the control devices is alternately moved from position to the other by separate timing means, one of which is governed in accordance with one temperature condition and the other being governed in accordance with another temperature condition. In operation the operator causes the regulating device to assume a mean position such that the average output of the heating apparatus is governed so as to maintain constant an average of the two-temperature conditions which are selected for the purposes of control.

My invention will be better understood from the following description taken in connection with the accompanying drawings in which Fig. 1 illustrates in diagrammatic form one embodiment of my invention, and Figs. 2 and 3 are graphical representations which are useful in explaining the operation of my invention.

For the purpose of illustrating a specific embodiment of my invention I have shown in Fig. 1 of the drawings temperature changing apparatus comprising a radiator 1 for supplying heat to a space 2, the temperature of which is to be controlled. The radiator, which may be of the steam or hot water type, is supplied with heating fluid through a main or conduit 3 which is in turn supplied with heating fluid from a suitable source, not shown.

A valve 4 located in conduit 3 acts as a regulating device governing, according to its position, the heat output of the radiator 1. For the purpose of controlling the position of valve 4 I have illustrated an operator in the form of an electric motor driven mechanism. This mechanism comprises a reversible electric motor, indicated generally at 5, which drives a shaft 6 through a suitable reduction gearing 7. Mounted on the end of the shaft 6 is a crank disk 8 carrying a crank pin 9. The crank pin is connected to the operating member of the valve 4 by means of a pitman 10 so that by rotation of the crank disk 8 in one direction or the other the valve is moved toward either a heat increasing or a heat decreasing position. A pair of limit switches 11 and 12 actuated by a cam 13 mounted on the shaft 6 are provided for preventing overtravel of motor 5 at the closed and open positions of valve 4.

The reversible motor 5 may be, as illustrated, of the condenser induction type comprising an armature 20 and a pair of field windings 21 and 22. The field windings 21 and 22 are connected together at one end thereof and between the opposite ends of the windings is connected a condenser 23. The junction of the field windings 21 and 22 is permanently connected by means of a conductor 24 to the terminal 25a of the secondary winding 25 of a stepdown transformer 26 having a primary winding 27 energized from a pair of power lines 28 and 29. The other terminals 30 and 31 of the field windings 21 and 22 are selectively connected to the terminal 25b of the secondary winding 25 by the conductors 32 and 33. The arrangement is such that when the conductor 32 is connected to the terminal 25b the capacitor 23 is in series with the winding 22 and when the conductor 33 is connected to the terminal 25b the capacitor 23 is in series with the winding 21. The current through the winding which is in series with the condenser leads the current through the other winding in phase and thus the direction of rotation of the armature 21 may be controlled by changing the winding in series with the condenser.

For the purpose of controlling the direction of rotation of the motor 5 and consequently the opening and closing movements of the valve 4 I provide a pair of two-position control devices illustrated as relay 35 and 36. The relays 35 and 36 have sets of normally closed contacts 38 and 39 and sets of normally open contacts 40 and 41. The normally closed contacts of both relays are connected in circuit with the conductor 33 and the normally open contacts of both relays are connected in circuit with the conductor 32. It will be evident from an inspection of the circuit connections that when both relays are in the normal or deenergized positions a circuit is completed from the terminal 25b of the transformer secondary winding 25 to the motor terminal 31 causing the motor 5 to rotate in one direction and when both relays are energized a circuit is completed from the terminal 25b of the transformer secondary winding through the conductor 32 to the motor terminal 30 causing rotation of the motor in the opposite direction. It will also be evident that when one relay is energized and the other is deenergized the circuits through both conductors 32 and 33 will be open and the motor is deenergized. One terminal of each of the operating coils 42 and 43 of the relays 35 and 36 is permanently connected to terminal 25b of the transformer secondary winding 25 by means of the conductor 44. The other terminal of the operating coil 43 of relay 36 is connected to the terminal 25a through the conductors 47 and 48 and the contacts of a room thermostat RT1. The other terminal of the operating coil 42 of the relay 35 is connected to the terminal 25a through the conductors 49 and 50 and the contacts of a room thermostat RT2. Thus it will be seen that the energization of the relays 36 and 35 is controlled by the thermostats RT1 and RT2 respectively.

The room thermostat RT1 is shown as comprising a bimetallic temperature responsive element 55 fixed at one end and carrying at its free end a movable contact 56. The contact 56 cooperates with a stationary contact 57 mounted on a fixed support 58. Also, attached to the support 58 is a permanent magnet 59 which, in cooperating with an armature 60 attached to the bimetal 55, acts to give the thermostat a temperature differential of operation in a manner well known in the art.

In order to cause the thermostat contacts to continuously move between the open and closed positions and thereby function as temperature responsive timing means, an auxiliary electric heater 61 is provided which is connected to be energized when the thermostat contacts are closed and deenergized when the contacts are opened. The energizing circuit for the electric heater 61 may be traced as follows: terminal 25a of the transformer secondary winding 25, the conductor 48, the thermostat contacts 56, 57, the bimetal 55, the heater 61, the conductor 47, the operating coil 43 of relay 36, conductor 44, and the terminal 25b of the transformer secondary 25. Thus, it will be apparent that when the thermostat contacts 56 and 57 close the heater 61 and the relay 36 will be energized. When the heater 61 has heated the bimetal 55 to the opening point the contacts 56 and 57 open due to a flexing of the bimetal 55 to the left and heater 61 and relay 36 are deenergized. Due to the heating action of the electric heater 61 the thermostat contacts continuously open and close causing energization and deenergization of the relay 36 at spaced time intervals which vary in accordance with the temperature at the location of the thermostat RT1. This action will be described in greater detail below.

The construction of the room thermostat RT2 is exactly the same as that of RT1 and the corresponding parts have been given like reference numerals. The room thermostat RT2 causes energization and deenergization of the relay 35 at spaced time intervals which vary in accordance with the temperature at the location of the thermostat RT2.

The room thermostats RT1 and RT2 may be located at selected control points in different temperature zones in space 2 and preferably these control points are selected in zones where maximum temperature differences exist. For example, RT1 may be located adjacent an outside wall and RT2 located adjacent an inside wall in cases where there is a high horizontal temperature gradient due to an outside exposure. In cases where there is a high vertical temperature gradient due to air stratification RT1 may be located at the floor level and RT2 at the breathing line level. The specific location of RT1 and RT2 will, of course, vary with different installations, the selected locations depending upon what temperature conditions are desired to be used for the purpose of obtaining an averaged control.

For proper operation of the system each thermostat should be adjusted so that its contacts remain closed 50 per cent of the thermostat cycle time at the desired average temperature to be maintained, which, for the purpose of illustration will be assumed to be 75 degrees F. The adjustment of each thermostat may be varied by changing the opening and closing temperatures of the thermostat contacts and by varying the maximum heating effect of the auxiliary heater 61. However, to secure the proper timing action the maximum heating effect of heater 61 must always be greater than the temperature differential of operation of the thermostat, i. e., the difference between the temperatures at which the thermostat contacts open and close. In Fig. 2 of the drawings the curve shows the relationship between the per cent cycle time the thermostat contacts remain closed (R) and the thermostat ambient temperature for the case which will be assumed where the maximum heating effect of heater 61 is 10 degrees F. and the thermostat opening and closing temperatures are 81 and 79 degrees F., respectively. The maximum heating effect of the auxiliary heater 61 means the number of degrees of temperature it can raise the thermostat temperature responsive element above ambient temperature if it is continuously energized. It will be noted by reference to Fig. 2 that R equals 50 per cent when the thermostat ambient temperature is 75 degrees F. It will be understood that the specific temperature values used in this description of my invention are for the purpose of illustration only and other temperature values may be selected as desired.

In operation the thermostats RT1 and RT2 jointly control the degree of opening of the valve 4 and consequently the output of radiator 1. The operation of the system is such that when the average of the ambient temperatures at RT1 and RT2 is at a predetermined value the average heat output of the radiator 1 remains constant and an equilibrium condition obtains. Upon any deviation of this average value from the predetermined value the heat output of the radiator 1 is automatically changed in a proper direction until the deviation is reduced to zero and a new equilibrium condition is established at a new radiator heat output.

It is believed that the manner of operation of my improved control system may be best explained by taking a concrete example for the purpose of illustration. In the subsequent description the following terminology will be used:

$T_0$ = Outside temperature
$T_1$ = Ambient temperature of $RT_1$
$T_2$ = Ambient temperature of $RT_2$
$T_A$ = Average of $T_1$ and $T_2$
$R_1$ = Per cent of thermostat cycle time contacts of $RT_1$ remain closed
$R_2$ = Per cent of thermostat cycle time contacts of $RT_2$ remain closed Reference will now be made to the chart shown in Fig. 3 of the drawings which illustrates the operation of my improved temperature control system under various conditions of operation. The time intervals during which the contacts of RT1 and RT2 are in the closed or "cold" position are indicated graphically by the shaded areas 65 and 66 respectively and the time intervals during which the contacts of RT1 and RT2 are in the open or "hot" position are indicated by the light areas 67 and 68 respectively. Since the thermostats RT1 and RT2 control the energization of relays 35 and 36 respectviely, the shaded areas 65 and 66 may also represent the time intervals each corresponding relay is energized and the light areas 67 and 68 the time intervals each relay is deenergized.

When both relays 35 and 36 are energized the closing of contacts 40 and 41 completes a circuit causing motor 5 to rotate in a direction to open valve 4 and when both relays are deenergized the closing of contacts 38 and 39 completes a circuit causing motor 5 to rotate in a direction to close the valve 4. As pointed out above when one relay is energized and the other is deenergized the motor 5 is deenergized and the valve 4 remains stationary.

It follows from the foregoing that when the contacts of both thermostats are closed both relays will be energized and the motor 5 will rotate in a direction to open valve 4. This condition is indicated by the upper shaded areas 69. Likewise, during the time when the contacts of both thermostats are open both relays will be deenergized and the motor 5 will rotate in a direction to close valve 4. This condition is indicated by the lower shaded areas 70. The curve V shows the variation in the position of valve 4 in per cent of maximum opening with time, the movements of the valve corresponding to the shaded areas 69 and 70.

First, let it be assumed that the conditions are such that $T_1$ equals 74 degrees F. and $T_2$ equals 76 degrees F. The operation of the system under these conditions is represented by the portion A of the chart. From the curve shown in Fig. 2 of the drawings it will be noted that $R_1$ equals 60 per cent and $R_2$ equals 40 per cent. Hence the shaded areas 65 are 60 per cent of the cycle time of $RT_1$ and the shaded areas 66 are 40 per cent of the cycle time of $RT_2$. It will be noted that for this condition the shaded areas 69 and 70 are equal which indicates that valve 4 moves alternately equal distances in opposite directions and hence its mean position per cycle and consequently the average heat output of radiator 1 remains constant. This is the desired condition since $T_A$ is at the predetermined value to be maintained which is 75 degrees F.

Now let it be assumed that $T_0$ starts to rise so that there is less heat loss from the space 2. Since the heat supplied by radiator 1 is greater than required to balance the heat loss from the space 2 the temperatures in space 2 will begin to rise. For the purpose of illustration it will be assumed that $T_1$ rises to 76 degrees F. and $T_2$ rises to 77 degrees F. so that $T_A$ is 76.5 degrees F. which is above the predetermined value of 75 degrees F. to be maintained. This condition is represented by the portion B of the chart. It will be noted that $R_1$ changes to 40 per cent and $R_2$ changes to 30 per cent and as a result the areas 69 become smaller than the areas 70. Hence the valve moves in an opening direction a shorter period of time per cycle than in the closing direction and as a result the valve moves in oscillating progression toward a closed position and decreases the average heat output of radiator 1.

The net movement of the valve 4 continues in a closing direction until a condition is reached where $T_A$ equals 75 degrees F. Let it be supposed that $T_0$ rises to a point where there is zero differential between $T_1$ and $T_2$. Thus when $T_1$ and $T_2$ both equal 75 degrees F. a new equilibrium will be reached since $T_A$ also equals 75 degrees F. This condition is indicated by the portion C of the chart. It will be noted that $R_1$ and $R_2$ both equal 50 per cent and the areas 69 and 70 are again equal so that the mean position of the valve 4 per cycle is again constant at a new position.

Now assume that $T_0$ falls to a value lower than the initial value. Since the heat supplied by the radiator will be less than the loss from the space 2 the temperatures therein will begin to fall. It will be assumed for illustration that $T_1$ falls to 73 degrees F. and $T_2$ falls to 74 degrees F. so that $T_A$ is 73.5 degrees F. This condition is represented by the portion D of the chart. It will be noted that $R_1$ changes to 70 per cent and $R_2$ changes to 60 per cent so that the areas 69 become larger than the areas 70. Hence the valve 4 moves in oscillating progression toward the open position and the heat output of radiator 1 is increased.

The opening movement of valve 4 will continue until $T_A$ again reaches 75 degrees F. Since it has been assumed that $T_0$ has fallen to a value lower than its initial value, corresponding to the portion A of the chart, the heat loss of the space 11 will be greater and hence a new equilibrium will not be reached until the valve has opened a greater amount than its initial position. For illustration, it will be assumed that for this new value of $T_0$ a 4 degree F. differential exists between $T_1$ and $T_2$. Hence when $T_1$ equals 73 degrees F. and $T_2$ equals 77 degrees F. a new equilibrium will be reached where $T_A$ is again equal to 75 degrees F. This condition is indicated by the portion E of the chart. It will be noted that $R_1$ changes to 70 per cent and $R_2$ changes to 30 per cent and the areas 69 and 70 are again equal so that the mean position of the valve 4 per cycle again remains constant at a new equilibrium position which is further open than the initial position.

It will be apparent from the foregoing that my improved control system is responsive to variations in both $T_1$ and $T_2$ and functions automatically to maintain their average value $T_A$ constant under varying conditions. It is interesting to note by particular reference to the portions A, C, and E of the chart shown in Fig. 3 that even though the temperature differential between $T_1$ and $T_2$ may vary under different conditions of outside temperature the average output of the radiator remains constant when the average of $T_1$ and $T_2$ reaches a predetermined value. In actual operation the temperatures $T_1$ and $T_2$ will vary gradually with changes in $T_0$. However, for the purpose of clarity and simplicity of description these changes have been shown as occurring abruptly.

Since my temperature control system is responsive to two temperature conditions of the conditioned space, it is obvious that the averaged control that it obtained functions to maintain an average temperature condition in the conditioned space which is much more nearly constant than would otherwise be obtainable with with the use of a single thermostat.

The thermostats may be located so as to be responsive to temperature conditions in entirely separate enclosures in systems where the operation of temperature changing apparatus under the control of a single regulating device functions to change the temperature in both enclosures. In such a case the average of the temperature conditions, in each enclosure would be maintained constant.

It will be understood that, while I have illustrated the operator as controlling the position of a modulating valve, the operator may control the movement of any regulating device which modulates according to its position the output of temperature changing apparatus without departing from my invention in its broader aspects. It will also be understood that my control system is applicable equally well to cooling as well as heating systems.

While I have shown and described particular embodiments of my invention, it will become apparent to those skilled in the art that my invention has other applications and that changes and modifications may be made without departing from the spirit and scope of my invention. I, therefore, aim in the appended claims to cover all such modifications and changes.

What I claim as new and desire to secure by Letters Patent of the United States is:

1. In a control system for maintaining constant an average of the temperature conditions in two zones, apparatus for changing the temperature conditions in said zones, a regulating device governing, according to its position, the output of said apparatus, a reversible motor for driving said regulating device, means inculding a pair of two position control devices for controlling said motor, so arranged that when both of said control devices are aligned in one position said motor drives said regulator in one direction and when both of said control devices are aligned in the other position said motor drives said regulator in the opposite direction but when said control devices are out of alignment said motor and said regulating devices remain stationary, timing means for moving one of said control devices alternately from one position to the other at spaced time intervals variable in accordance with the temperature condition in one of said zones and a second timing means for moving the other of said control devices alternately from one position to the other at spaced time intervals variable in accordance with the temperature condition in the other of said zones.

2. In a system for controlling the temperature changing apparatus in accordance with the average of two temperature conditions, the combination comprising a regulating device for modulating according to its position the effect of said apparatus, a reversible electric motor for driving said regulating device, a pair of two position circuit controllers, each of said circuit controllers having a set of normally open and a set of normally closed contacts, an energizing circuit including the normally closed contacts of both of said circuit controllers for causing movement of said motor in one direction, an energizing circuit including the normally open contacts of both of said circuit controllers for causing movement of said motor in the opposite direction, means for actuating one of said circuit controllers alternately from one position to the other at spaced time intervals variable in accordance with one of said temperature conditions, and means for actuating the other of said circuit controllers alternately from one position to the other at spaced time intervals variable in accordance with the other of said temperature conditions.

3. In combination, apparatus for changing the temperature condition in two zones, a regulating device for regulating, in accordance with its position, the capacity of said apparatus, a reversible operator for moving said regulator, a pair of control devices having heat increasing and heat decreasing positions for jointly controlling the direction of movement of said operator, means for moving one of said control devices alternately from one position to the other at spaced time intervals variable in accordance with the temperature conditions in one of said zones, means for moving the other of said control devices alternately from one position to the other at spaced time intervals variable in accordance with the temperature condition in the other of said zones, and means for preventing movement of said operator when said control devices are in different positions.

4. In a system for controlling the output of condition changing apparatus in accordance with an average of two variable conditions influenced by the operation of said apparatus, the combination comprising a regulating device for governing according to its position the output of said apparatus, a reversible operator for driving said regulator, means including a pair of two position control devices for controlling the direction of movement of said operator so arranged that when both of said control devices are aligned in one position said motor drives said regulating device in one direction and when both of said control devices are aligned in the other position said operator drives said regulating device in the opposite direction but when said control devices are out of alignment said operator and said regulating device remain stationary, timing means for moving one of said control devices alternately from one position to the other at spaced time intervals variable in accordance with one of said conditions, and a second timing means for moving the other of said control devices alternately from one position to the other at spaced time intervals variable in accordance with the other of said conditions.

5. In a control system for maintaining constant an average of the temperature conditions in two zones, apparatus for changing the temperature conditions in said zones, a regulating device governing according to its position the output of said apparatus, a thermostat responsive to the temperature in one of said zones, said thermostat having "hot" and "cold" positions, an auxiliary heater for locally influencing said thermostat, said heater being energized when said thermostat is in the "cold" position and deenergized when said thermostat is in the "hot" position whereby said thermostat continuously cycles between "hot" and "cold" positions, a second thermostat responsive to the temperature condition in the other of said zones, said second thermostat having "hot" and "cold" positions, an auxiliary heater for locally influencing said second thermostat, said heater for said second thermostat being energized when said second thermostat is in the "cold" position and deenergized when said second thermostat is in the "hot" position whereby said second thermostat continuously cycles between "hot" and "cold" positions, and means controlled by said thermostats for moving said regulating device in the heat increasing direction when both of said thermostats are in the "cold" position and for moving said regulating device in the heat decreasing direction when both of said thermostats are in the "hot" position, said means being ineffective to move said regulating device when said thermostats are in different positions.

6. In a system for controlling temperature changing apparatus in accordance with an average of two temperature conditions, the combination comprising a regulating device for varying progressively according to its position, the temperature changing effect of said apparatus, a first control device, a second control device, each of said control devices having an element movable between first and second control positions, means associated with each control device for causing its movable element to move intermittently between the first and second control positions, means responsive to one of said temperature conditions for varying the relative time intervals the movable element of said first control device remains in the first and second control positions, means responsive to the other of said temperature conditions for varying the relative time intervals the movable element of said second control device remains in the first and second control positions, and means controlled jointly by said first and second control devices for causing said regulating device to progress in a direction depending on whether the percentage of time said control devices are simultaneously in the first control position is greater or less than the percentage of time said control devices are simultaneously in the second control position, the progression of said regulating device being zero when said percentages are equal.

7. In a control system for maintaining constant an average of temperature conditions in two zones, apparatus for changing the temperature conditions in said zones, a regulating device governing progressively according to its position the output of said apparatus, a first control device, a second control device, each of said control devices having an element movable between first and second control positions, means associated with each control device for causing its movable element to move intermittently between the first and second control positions, means responsive to the temperature condition of one of said zones for varying the relative time intervals the movable element of said first control device remains in the first and second control positions, the relative time intervals being equal when the temperature condition in the said one of said zones is at a predetermined value, means responsive to the temperature condition in the other of said zones for varying the relative time intervals the movable element of said second control device remains in the first and second control positions, the relative time intervals being equal when the temperature condition in the other of said zones is at said predetermined value, means controlled jointly by said first and second control devices for actuating said regulating device in one direction when the movable elements of said control devices are both in the first control position and in the opposite direction when the movable elements of said control devices are both in the second control position whereby said regulating device progresses in a direction depending on the direction of deviation of the average of the temperature conditions in said two zones from said predetermined temperature value upon the occurrence of such a deviation, the mean position of said regulating device remaining constant when said average temperature is at said predetermined value.

MARCUS E. FIENE.